March 17, 1964  A. L. LALIBERTE  3,125,477
METHOD OF SPLICING RIBBON RUBBER THREAD
Original Filed Jan. 7, 1960  2 Sheets—Sheet 1
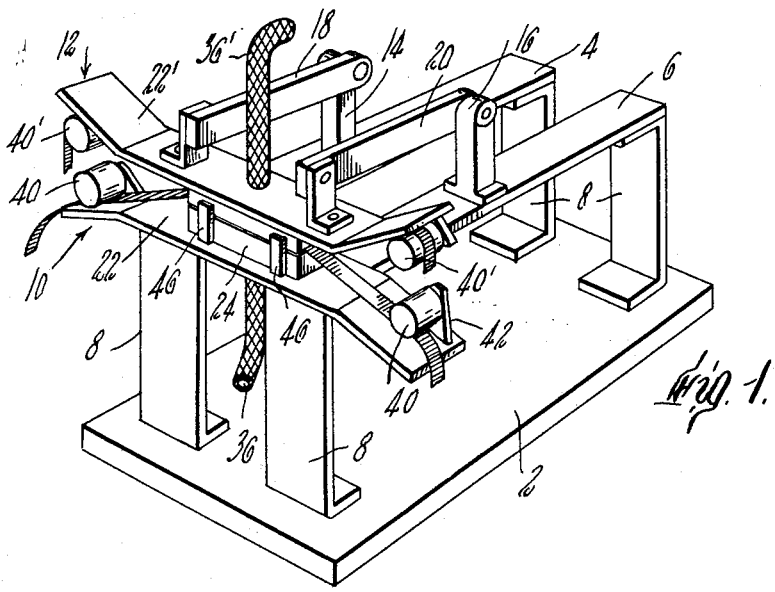
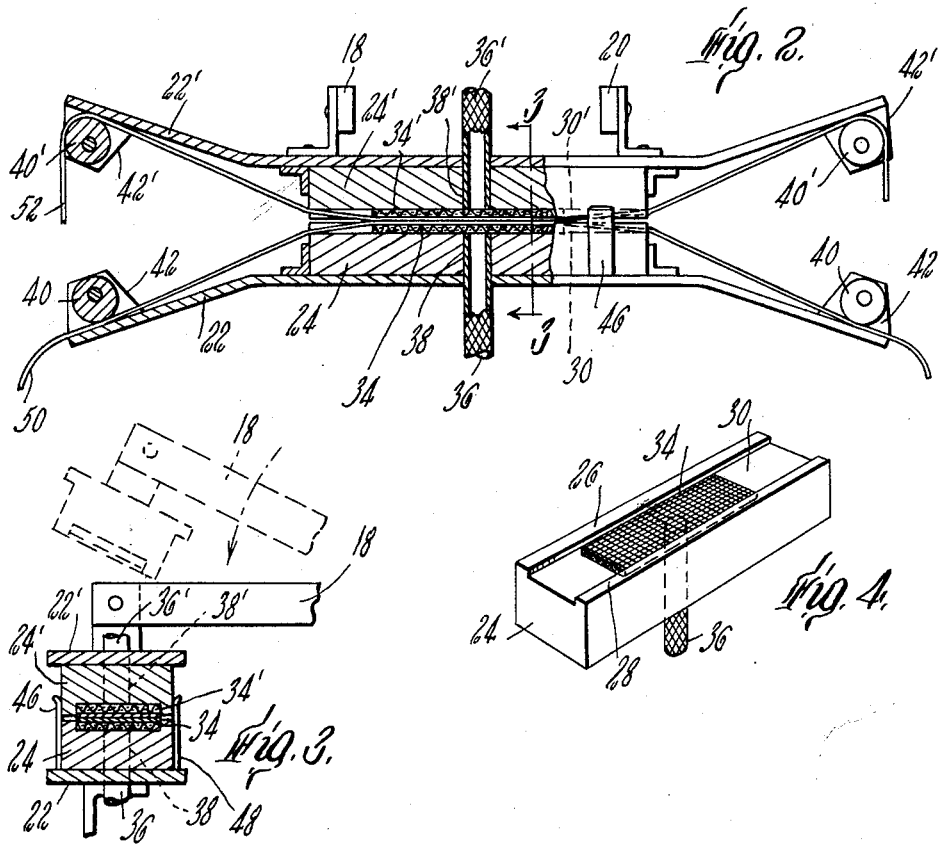

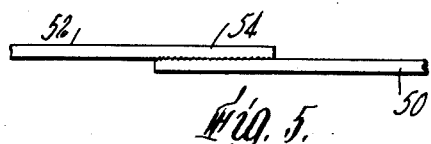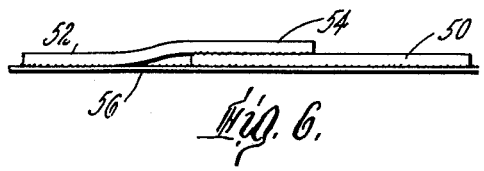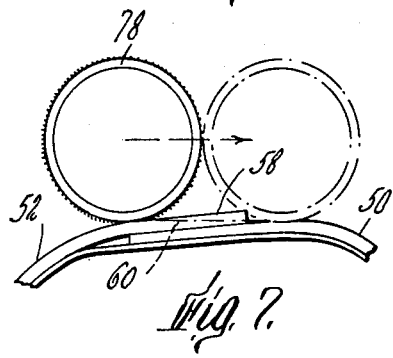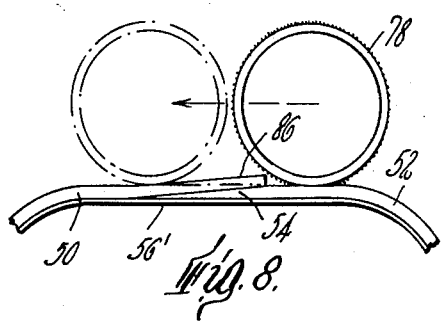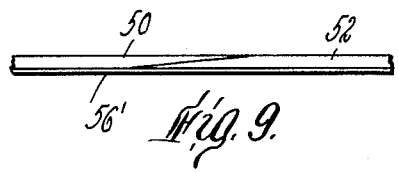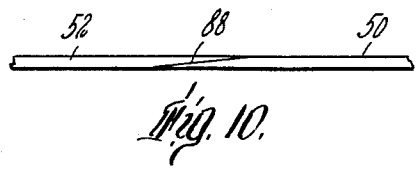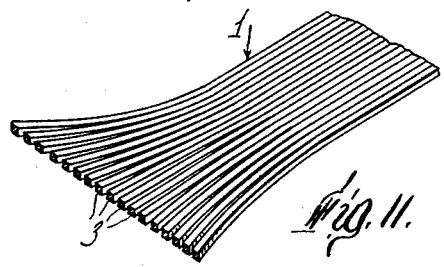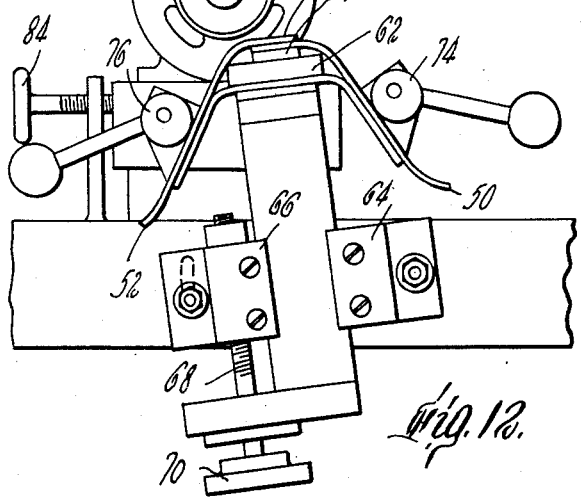

United States Patent Office 3,125,477
Patented Mar. 17, 1964

3,125,477
METHOD OF SPLICING RIBBON
RUBBER THREAD
Arthur L. Laliberte, Easthampton, Mass., assignor to United Elastic Corporation, Easthampton, Mass., a corporation of Massachusetts
Original application Jan. 7, 1960, Ser. No. 1,049, now Patent No. 3,029,180, dated Apr. 10, 1962. Divided and this application Dec. 6, 1961, Ser. No. 157,508
3 Claims. (Cl. 156—154)

The present invention relates to a method for splicing ribbon rubber thread consisting of a multiplicity of rubber threads separably joined together side by side in the form of a tape or ribbon.

The present application is a division of my application Serial No. 1,049, filed January 7, 1960, entitled Splicing of Ribbon Rubber Thread, now Patent No. 3,029,180.

Rubber thread is commonly manufactured in the form of ribbon containing many fine threads, such as 40 or more of a thickness of the order of 1/64", which are adhesively united to each other in parallel side by side relationship by an adhesive bond which is strong enough to maintain the integrity of the ribbon during storage and handling but may readily be broken when that is desired to release the threads for individual use, for example for use as warp yarns in a weaving operation.

One type of ribbon thread to which the invention is particularly applicable is made as disclosed in Shaw Patent No. 2,082,743. This method involves continuously cutting a tape or ribbon from a stack of adhesively joined thin annular calendered rubber sheets by rotating the stack with its edge in contact with a rapidly rotating disc cutter so that a ribbon comprising many threads, one being cut from each sheet, is continuously taken away from the cutter. In these ribbons the threads are of square cross-section, the dimension widthwise of the ribbon being determined by the thickness of the individual sheets and the dimension at right angles thereto being determined by the depth of cut of the rotary disc cutter. The widths of ribbons of the same nominal size will differ more or less due to slight variation in thickness of the calendered sheets in any one stack from the thickness of those in another stack. Such variation, in current manufacturing practice, may run to as high as 1/32 inch difference in width, in a 40-thread ribbon, between the most under-sized and the most over-sized ribbon of the same nominal size.

Necessarily the thread ribbons formed by this method are of a limited length, as the maximum length which can be produced is determined by the diameter of the largest diameter stack of sheets which can be handled in cutting apparatus of practicable size. There has been need in the industry for a long time for cut thread ribbon of greater length than could be provided by the standard procedures but, heretofore, so far as I am aware, it never has been found practical to splice such ribbons to provide longer lengths, primarily because of the difficulty of handling this stretchy, flexible material and because of said variation in the width of the ribbon from ribbon to ribbon.

An object of the invention is to provide a method for splicing ribbon rubber thread containing many threads in parallel relationship side by side and adhesively but separably joined to each other.

A further object is to provide a method for splicing such rubber ribbons wherein a thread of one ribbon will be accurately joined to a single thread of the other ribbon despite differences in width of the ribbon.

Other and further objects and features of the invention will become apparent from the following description of illustrative particular ways of practicing the method of the invention, wherein reference is made to the accompanying drawings, in which, FIG. 1 is a perspective view of an apparatus useful in practicing the method;
FIG. 2 is a vertical transverse mid-sectional view through the ribbon-holding jaws of the apparatus of FIG. 1;
FIG. 3 is a vertical cross-sectional view on line 3—3 of FIG. 2;
FIG. 4 is a perspective view of a ribbon holding block detached from the apparatus;
FIGS. 5 through 10 inclusive are schematic side elevations of ribbon during splicing, showing successive steps of the process.
FIG. 11 is a perspective view of a thread ribbon with which the present invention is concerned, the threads being fanned out at one end to show the construction of the ribbon; and
FIG. 12 is an elevation of an abrading or skiving apparatus useful in performing a part of the process.

In accordance with the invention we splice simultaneously all of the threads in one thread ribbon to the respective threads of another similar thread ribbon having the same number of threads by first forming the two ribbons to the same width, for example, by stretching one or both ribbons or by compressing one or both ribbons sidewise, holding the ribbons at this width and flat or substantially flat, then positioning the so-formed and held ribbons so that their respective edges are accurately registered with each other, and then while the ribbons are so held and positioned, adhesively uniting a face of one ribbon to a face of the other ribbon. Since the two ribbons are, at the instant of uniting, of the same width, a face of each thread of one ribbon is united to a face of the corresponding thread of the other ribbon. When the ribbons subsequently are released, the ribbon which was originally the wider will tend to reassume its original width, but, since the original difference in width of the ribbons was at the most only slight and since this width difference is divided equally among all of the threads, for example 40 threads in one standard size of ribbon, the width difference present in one pair of united and spliced threads is not significant.

Ordinarily the splice will be made at a position near an end of each ribbon and after splicing the shorter ends will be cut off close to the splice and discarded.

Finally, the thickness of the spliced ribbon at the united portions is reduced to that of the unspliced ribbon.

Apparatus useful in practicing the invention, as disclosed and claimed in my prior application referred to above, may comprise a pair of jaws for each ribbon and means for holding the ribbon between the jaws at a fixed width and in a substantially flat condition. The predetermined width at which each ribbon is held, as established by the spacing between the jaws, is made the same for the two pairs of jaws and thus the same for the two ribbons to be joined. Means is provided for positioning one pair of jaws adjacent the other so as to superpose a face of one ribbon on and in tight contact with a face of the other with their corresponding edges accurately registered with each other.

Referring to the drawing, a representative rubber thread ribbon to which the invention is applicable is shown at 1, FIG. 11. The individual threads 3 are of square cross-section and adhesively joined together side by side, as shown. The appearance of the joints between ribbons is exaggerated in the drawing for purposes of illustration. In actual ribbons the joints are imperceptible, or scarcely perceptible, and the ribbons can be freely handled without causing separation of the threads.

The splicing apparatus shown in the drawing comprises a base 2 on which frame members 4 and 6 are rigidly supported, each on two upright standards 8. A fixed ribbon holding member indicated generally at 10 is rigidly mounted in fixed position at one end of frame members 4 and 6. A similar but movable ribbon holding member indicated generally at 12 is supported on the frame members 4 and 6 for pivotal movement into and out of a position in which it cooperates with the fixed ribbon holding member 10. For this purpose, a bearing member 14 is supported on frame member 4, near the middle thereof, and a similar bearing member 16 is supported in a similar position on the frame member 6. Arms 18, 20 are each journaled at one end in the bearing members 14, 16 respectively for swinging movement in a vertical plane. The movable ribbon holding member 12 is rigidly connected to the outer ends of the arms 18, 20 for pivotal movement therewith to and from its position in which it cooperates with the fixed ribbon holding member 10.

The purpose of each ribbon holding member is to support a portion of one of the two ribbons to be spliced and hold it accurately in shape and position after it has been formed to a width which is the same for the two ribbon portions to be joined together. The movable arms 18, 20 carrying the movable ribbon holding member 12 permit this member to be swung to a backward position, remote from the other ribbon holding member, in which position the ribbons conveniently can be placed in or removed from the ribbon holding members. The movable ribbon holding member 12 then can be swung to its forward position, cooperating with the fixed ribbon holding member 10 to accurately position the two ribbons with their faces in contact and with corresponding edges of the faces in accurate registry with each other, and with the threads of one ribbon aligned with threads of the other.

The fixed ribbon holding member 10, as appears particularly in FIGS. 2, 3 and 4, comprises a base member 22 formed from a rigid material such as steel and joined directly to the frame members 4 and 6, as by welding. Mounted upon the base member 22 is a ribbon holding block 24 providing a spaced pair of ribbon holding jaws 26, 28 (FIG. 4) upstanding along the transverse edges of the block. The fixed lower edges of the jaws are connected by a flat surface 30.

Overlying a portion or all of the flat surface 30 is a fine wire screen 34. A stainless steel screen about 0.010 inch thick and of very fine mesh is satisfactory. The portion of the ribbon to be joined to the other ribbon is supported on the screen.

The height of the jaws 26, 28 is less than the sum of the tape thickness and the thickness of the screen 34. A height such that about one-half the thickness of the tape extends above the jaws is satisfactory.

To hold the ribbon flat and firmly in position between and in contact with the jaws during the splicing operation a slight vacuum is applied to the under surface of the ribbon through the screen 34. For this purpose, a flexible hose 36, communicating with the surface 30 through a passageway 38 provided in the block 24, is connected at its other end to a suitable vacuum line, desirably through a hand-operated valve, not shown.

The base member 22 extends beyond the ends of the ribbon holding block 24 and its outer ends are inclined downwardly, as shown. At each end of the base member 22, on its upper face, is mounted a clamp for holding an end of the ribbon, to maintain the ribbon in position against the screen 34 and between the jaws 26, 28. Each clamp comprises a cylindrical eccentric 40 supported on an upstanding ear 42 welded to the base member 22 and provided with an operating handle (not shown) for rotating the eccentric between the position in which it engages the ribbon to clamp it against the base member 22 and the position in which it frees the ribbon.

The movable ribbon holding member 12 is the same in construction as the fixed ribbon holding member 10 just described and hence will not be separately described in detail. Corresponding parts of the two ribbon holding members 10 and 12 are indicated by the same reference numerals, the numerals for the various parts of the movable member 12 being primed.

Locating lugs 46 are positioned at one of the edge faces of the fixed ribbon holding block 24 so that when the movable ribbon holding block 24' moves into cooperating relationship with the fixed block 24 it is positioned to locate the inner surfaces of the jaws 26, 26' (and 28, 28') in accurate registry and thereby accurately register the corresponding edges of the meeting faces of the two ribbons. Such locating lugs may be positioned as shown at 46, or may be positioned on the opposite side of the block 24 as shown at 48, FIG. 3, or in both positions.

In practicing the splicing process, the movable ribbon holding member 12 is swung rearwardly on its bearings 14, 16 to rest on the rearward portion of the frame members 4, 6 with the jaws 26', 28', extending upwardly and the surface 30' exposed. The fixed ribbon holding member 10 is similarly oriented at the forward ends of the frame members 4 and 6. One of the two ribbon portions to be spliced together, 50, is inserted between the jaws 26, 28 and the other ribbon 52 between the jaws 26', 28', each with its edges tightly engaging the inner surfaces of the jaws. This may conveniently be done by clamping one end of the ribbon with the eccentric 40 (or 40') at one side of the ribbon holding member, stretching the ribbon across the ribbon holding block and positioning its other end beneath the eccentric 40 (or 40') at the opposite side of the ribbon holding member. The free end of the ribbon extending beyond the open eccentric 40 then can be moved away from the jaws to stretch the ribbon to allow it to fit freely between the jaws and lie flat against the flat screen 34 (34'). The free end of the ribbon will then be moved inwardly, toward the ribbon holding block, to decrease the tension in the ribbon and cause it to expand in width until the ribbon fits tightly between the jaws, whereupon the clamp is closed. The tightness of fit may be such, for example, as to reduce the width of the ribbon by about 1/10 inch. Such stretching may be done with both ribbons or only with the wider ribbon. Preferably it is done with both and the spacing between the jaws is made enough less than the standard or average width of the size of ribbon for which the jaws are built so that even the narrowest undersize ribbon of that size will be under slight compression when fitted between the jaws as described. The ribbon in this case is always stretched slightly during insertion in the holding block and when the tension is released the ribbon expands sidewise to tightly engage the jaws so that both of the ribbons to be spliced are compressed by the jaws and confined to the same width.

The valves in the hose 36, 36' then are opened to further mold the ribbons into tight fitting engagement at their edges with the jaws and into flat position against the screens and to hold the ribbons in this position. In this way the two ribbons are formed to a fixed width which is the same for each and then are held flat at this width.

When both ribbons have been properly located in their respective holding members, a rubber solvent or a rubber adhesive is applied to the exposed face of the portion of one or both of the ribbons positioned between the jaws. The ribbon holding members are then closed by swinging the movable ribbon holding member 12 forwardly and downwardly, as shown in dash lines in FIG. 3. This closing movement brings the two exposed faces of the ribbon into contact, with their corresponding edges accurately registered in the same vertical planes and with each thread of one ribbon aligned with the corresponding thread of the other ribbon, so that adhesive union of each thread of one ribbon to the corresponding thread of the other ribbon takes place.

After whatever interval of time is required for the formation of a sufficiently strong adhesive joint between the ribbons to permit handling, as is well known in the art, the clamps 40, 40' may be opened, the movable ribbon holding member 12 swung backwardly to open position, and the ribbons removed from the apparatus.

The shorter ends of the ribbons extending beyond the spliced portions are then cut off close to the adhesively joined surfaces and these severed ends discarded. The spliced ribbon in this condition appears schematically in edge view in FIG. 5.

The next operation involves reduction of the thickness of the spliced ribbon at the spliced portion 54 to the thickness of the unspliced ribbon, along surfaces which merge smoothly into the faces of the ribbon. This operation I carry out in several steps illustrated schematically in FIGS. 5–10. First I secure the spliced ribbon against stretching by attaching to one of its faces a relatively non-stretchable backer which may conveniently be any relatively non-stretchable pressure-sensitive adhesive tape such as a masking tape 56, FIG. 6. I then remove a wedge-shape portion 58 from the ribbon 52 at the joint 54 along the plane indicated by dot-dash line 60 in FIG. 7. Conveniently this is done by means of a skiving or abrading operation. A convenient apparatus for the purpose is illustrated in FIG. 12. This apparatus comprises a work supporting table 62 which is adjustable, along a line at a slight inclination to the vertical, in guides 64, 66 by means of a lead screw 68 which may be adjusted by means of the hand wheel 70. The work table 62 is faced on its upper surface with a pad 72 of relatively rigid but slightly yieldable material. The spliced ribbon is placed in the apparatus with the backer 56 downwardly and with its spliced portion 54 supported on the work table on pad 72 and secured in position by means of eccentric clamps 74, 76 engaging the ribbons 50, 52. An abrasive cylinder 78 carried on the shaft 80 of a driving motor 82 is horizontally movable transversely of the work table and longitudinally of the ribbon on horizontal ways (not shown) by rotation of a hand wheel 84. The inclination of the upper face of the work table with respect to the horizontal plane along which the lowermost part of the abrasive cylinder 78 travels is such as to correspond to the wedge angle of the wedge portion 58 to be removed from the ribbon and is exaggerated in the drawings for purposes of illustration. The lead screw 68 is adjusted so that as the abrasive cylinder is moved to the right (FIG. 7) it first makes contact with the face of ribbon 52 along a line extending transversely of the ribbon adjacent to the left side of the spliced portion 54, as it is seen in FIG. 7. As the abrasive cylinder is moved on across the spliced portion 54 it removes the wedge shaped portion 58 and passes out of contact with the ribbon approximately at the farther or right hand edge of the spliced portion 54 as seen in FIG. 7.

Thereupon the spliced ribbon is removed from the apparatus of FIG. 12, the backer 56 stripped away and another backer 56' applied to the face of the ribbon which has just been treated. The spliced ribbon is now in the condition shown in FIG. 8, in which the ribbon has been turned end for end and upside down from the position in which it is shown in FIG. 7. The ribbon is again placed in the apparatus of FIG. 12 with the backer 56' downwardly against the pad 72 and the abrasive cylinder 78 again (FIG. 8) traversed across the length of the spliced portion 54, removing a wedge shaped portion 86, similar to the portion 58, from the ribbon 50, leaving the spliced ribbons in the condition shown in FIG. 9. The backer 56' is stripped away. The resulting spliced ribbon, FIG. 10, is uniform in thickness and comprises the two portions 50 and 52 united along a plane 88 which extends from one face of the spliced ribbon to the other at an inclination to the faces.

The individual spliced threads may be separated from each other in the neighborhood of the splice 54, before the adhesive has fully set, if necessary or desired, so that there will be no risk that any adhesive bonds between adjacent threads, that may by chance have been formed during the splicing operation, will later be present to interfere with subsequent separation of the ribbon into its component threads.

Although a particular manner of procedure for carrying out the method of the invention, together with a detailed disclosure of one particular presently-preferred apparatus useful in carrying out the method, have been described and shown for purposes of illustration, it will be understood that the invention may be carried out in various other ways as will be readily apparent to those skilled in the art upon consideration of the disclosure hereof. For example, it is not intended to exclude the possibility that one or both of the jaws 26, 28 may be made adjustable on the block 24, to adapt the block for use with more than one ribbon tape size, or to permit the jaws to be separated for insertion of the ribbon between the jaws and then closed on the ribbon to slightly compress it. The blocks 24, 24' may be made removable from the supporting bases 22, 22' so that they may be replaced by different blocks with different jaw spacings to adapt the machine for use in splicing ribbon of different nominal widths.

The invention is not confined to the use of abrading apparatus of the type of FIG. 12, as any means which will remove the described wedge-shaped portion, whether by an abrading, cutting or other type of operation, may be used in the method of the invention.

The invention is particularly useful for splicing cut rubber thread, for instance, cut rubber thread of the type disclosed in the Shaw patent referred to, but it also may be used with ribbon rubber thread of other types, for example, rubber thread made from latex by extrusion or casting procedures, such as the threads disclosed in the Shaw Patent No. Re. 20,977, for example, or with any thread ribbon containing a multiplicity of rubber threads separately joined side by side.

Although I refer herein to the thread ribbons to which the invention is applicable as "rubber" thread ribbons in accordance with the usage in the art, it is not intended thereby to exclude other materials than rubber, as the invention is not confined to ribbons of natural rubber but is equally applicable to ribbons of any material which is flexible and elastic, e.g., materials such as the synthetic rubbers and resins.

When reference is made herein to the widths at which the two ribbons are held during the uniting step (and to the spacing between the two jaws of each pair) as being "the same" width or spacing, it is not meant that these widths or spacings must be mathematically identical, but it is intended to include within this term such slight width or spacing differences as do not prevent splicing of the ribbon with an accuracy sufficient for its intended use. For the usual present day commercial uses, such difference in width will not exceed a small fraction of the width of a single thread of the ribbon to be handled, preferably not exceed about one-tenth the width of such single thread.

By the method of the invention ribbon rubber thread may be spliced with the individual threads united so accurately and of such dimensional uniformity that the ribbon is highly satisfactory for all of the standard uses for which one-piece ribbons now are employed. The spliced ribbons can be run in standard apparatus employed in the handling of present day one-piece ribbons, for example the apparatus of Shaw Patent No. 2,169,886 or of Francis Patent No. 2,246,917.

The threads of the spliced ribbons may when separated be covered with a wound, braided or other covering, without interference with the covering operation by the spliced joint. The joints in the thread are smooth and for practical purposes substantially imperceptible, whether the thread has been covered or not.

It will be appreciated, also, that the spliced joints can be made fully as strong as the unspliced ribbon.

The invention makes it possible for the first time, so far as I am aware, to splice a fresh supply of ribbon onto ribbons while they are actually in use to supply threads to fabricating machinery, such, for example, as weaving, braiding, beaming, or knitting machinery, with the result that continuous endless thread can be supplied to the machine.

I claim:

1. The method of splicing together two rubber ribbons substantially the same in thickness and each consisting of a multiplicity of fine rubber threads separably joined side by side widthwise of the ribbon, which comprises forming at least one of the ribbons to bring a portion of each of the ribbons near an end thereof to the same width, holding said portions at said width, positioning a widthwise face of said so-held portion of one ribbon in contact with a widthwise face of said so-held portion of the other ribbon with the corresponding edges of said faces in accurate registry with each other, adhesively uniting said faces while so held and positioned, whereby a face of each thread of one ribbon is united to a face of a thread of the other ribbon, removing the shorter end extending from the united face of each ribbon, and reducing the thickness of the united portions of the ribbons to the thickness of the unspliced ribbon.

2. The method of splicing together two rubber ribbons substantially the same in thickness and not differing more than slightly in width and each consisting of a multiplicity of fine rubber threads separably joined side by side widthwise of the ribbon, which comprises stretching at least the wider ribbon at a portion thereof near an end thereof to reduce it to the same width as a portion of the other ribbon near an end thereof, holding said portions at said width, positioning a widthwise face of said so-held portion of one ribbon in contact with a widthwise face of said so-held portion of the other ribbon with the corresponding edges of said faces in accurate registry with each other, adhesively uniting said faces while so held and positioned, whereby a face of each thread of one ribbon is united to a face of a thread of the other ribbon, removing the shorter end extending from the united face of each ribbon, and reducing the thickness of the united portions of the ribbons to the thickness of the unspliced ribbon.

3. The method of splicing together two rubber ribbons substantially the same in thickness and not differing more than slightly in width and each consisting of a multiplicity of fine rubber threads separably joined side by side widthwise of the ribbon, which comprises stretching at least the wider ribbon at a portion thereof near an end thereof to reduce it to the same width as a portion of the other ribbon near an end thereof, holding said portions at said width with a widthwise face of each portion flat, positioning said face of said portion of one ribbon in contact with said face of said portion of the other ribbon with the corresponding edges of said faces in accurate registry with each other, adhesively uniting said faces while so held and positioned, whereby a face of each thread of one ribbon is united to a face of a thread of the other ribbon, removing the shorter end extending from the united face of each ribbon, and reducing the thickness of the united portions of the ribbons to the thickness of the unspliced ribbon.

References Cited in the file of this patent

UNITED STATES PATENTS

| | | |
|---|---|---|
| 2,294,088 | Kholas | Aug. 25, 1942 |
| 2,514,184 | Lower | July 4, 1950 |
| 3,055,786 | Hendrix | Sept. 25, 1962 |
| 3,059,656 | Seubert et al. | Oct. 23, 1962 |